United States Patent [19]

DiStefano

[11] Patent Number: 5,548,017

[45] Date of Patent: Aug. 20, 1996

[54] RELEASE COATING FOR PRESSURE SENSITIVE ADHESIVES

[75] Inventor: Frank V. DiStefano, Macungie, Pa.

[73] Assignee: Air Products and Chemicals, Inc., Allentown, Pa.

[21] Appl. No.: 416,563

[22] Filed: Apr. 4, 1995

[51] Int. Cl.$^6$ ........................ C08L 77/08

[52] U.S. Cl. ............ 524/514; 524/156; 524/167; 524/168; 524/369; 524/501

[58] Field of Search ................... 524/167, 168, 524/156, 369, 514, 501

[56] References Cited

U.S. PATENT DOCUMENTS

| | | | |
|---|---|---|---|
| 3,978,274 | 8/1976 | Blum | 428/476 |
| 4,386,183 | 5/1983 | Wempe | 524/405 |
| 4,587,167 | 5/1986 | Maietti et al. | 428/352 |
| 4,623,392 | 11/1986 | Ou-Yang | 106/27 |
| 5,284,690 | 2/1994 | Williams et al. | 428/40 |

*Primary Examiner*—Ana L. Carrillo
*Attorney, Agent, or Firm*—Russell L. Brewer; Mary E. Bongiorno

[57] ABSTRACT

This invention relates to a release coating for pressure sensitive adhesive designed primarily for use on paper and textile substrates. The basic release coating comprises a latex containing polymer material and a release additive. The improvement in the basic release coating comprises the incorporation of a polyamide resin having a softening point of less than 70° C. as a release additive. Preferably, the polyamide resin is a dimer fatty acid reacted with an aliphatic or cycloaliphatic amine.

9 Claims, 6 Drawing Sheets

WET WEIGHT AEROSOL 22 PER 100
WET PARTS A4530 + M1022

RELEASE COATING FOR PRESSURE SENSITIVE ADHESIVES

TECHNICAL FIELD OF THE INVENTION

This invention relates to release coating compositions for pressure sensitive adhesives.

BACKGROUND OF THE INVENTION

Pressure sensitive adhesives have wide spread use as a bonding agent for paper and textile substrates in the preparation of tapes, labels, decals and the like. For self-wound tapes the substrates are coated on one side with a pressure sensitive adhesive and a release agent on the other side. The release coating serves to permit the tape to be wound onto itself and then permit the release of the tape without removing the adhesive, destroying the textile or paper-based substrate, or decreasing the performance of the adhesive.

The ability of the release coating to effect release of the pressure sensitive adhesive from the back side of the substrate is only one of the requirements for a commercially acceptable release agent. One of the requirements of a release coating is that none of its components migrate into the pressure sensitive adhesive during storage of the tape or adhere to the adhesive surface during the unwinding of the tape. Migration or adherence of the release agent into the pressure sensitive adhesive tends to diminish the tackiness of the adhesive and tends to render the tape, film, etc. unusable. Another requirement of a release coating is that it be able to withstand long storage times and variations in temperature and humidity. Deterioration of the release agent over time may cause the pressure sensitive adhesive to adhere to the release coat often resulting in a tearing of the substrate during the unwinding of the tape.

Representative patents which describe a variety of release coatings for pressure sensitive adhesives are as follows:

U.S. Pat. No. 4,386,183 discloses a release coating based on polyvinyl alcohol. A variety of release materials for pressure sensitive adhesives are disclosed and these include silicones, fluorocarbons, fatty acid/metal complexes and hydrocarbon waxes. The release coating composition comprises polyvinyl alcohol, and a migratable release promoting agent, a water soluble salt of a coordinating metal and a water soluble boron compound.

U.S. Pat. No. 5,284,690 discloses aqueous release coatings for pressure sensitive adhesives based upon a water soluble polymer and an aqueous dispersion of an organic compound having at least one fatty acid ester and one quaternary amine. The polymeric component of the release component is based upon an acrylic ester monomers such as methyl or butylacrylate, styrene, vinyl acetate and the like. Acid functionality is incorporated into the polymer through polymerization of unsaturated acids such as acrylic or methacrylic acid. Examples of organic compounds having at least one fatty acid ester and a quaternary amine include di and triglycerides having a quaternary amine functional group replacing one of the fatty acid groups include lecithin and hydroxylated lecithin.

SUMMARY OF THE INVENTION

This invention relates to a release coating for pressure sensitive adhesive tapes. A basic release coating generally comprises a film forming polymeric material and a release additive. The improvement in this basic release coating comprises the incorporation of a polyamide resin having a softening point of greater than 70° C. as a release additive. Preferably, the polyamide resin is a dimerized $C_{16-18}$ fatty acid reacted with an aliphatic, aromatic or cycloaliphatic amine.

There are significant advantages associated with the release coating of this invention and they include:

a release coating which is environmentally friendly in that it contains no formaldehyde generating or toxic metal crosslinkers as commonly used in the prior art;

a release coating which has excellent performance in both general and high tack tape under high humidity and extended aging conditions; and, a release coating which has an excellent shelf life and long term resistance to migration into the pressure sensitive coating.

THE DRAWINGS

FIG. 2 is a contour plot of humidity aged release verses component concentration for a release coating based on an ethylene/vinyl chloride resin.

DETAILED DESCRIPTION OF THE INVENTION

Figure 1:
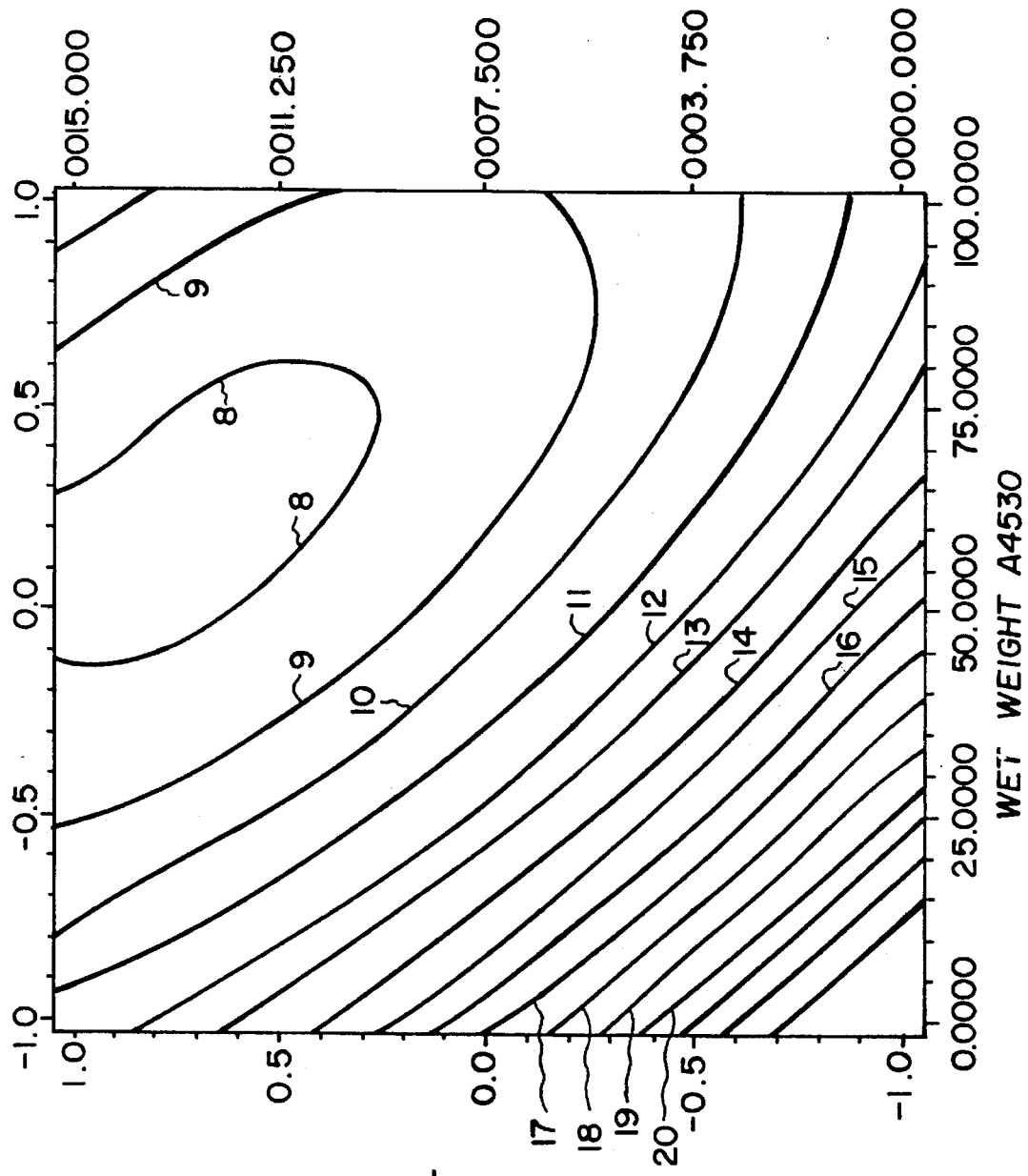
FIG. 1 is a contour plot of initial release verses component concentration for a release coating based on an ethylene/vinyl chloride resin.

One of the components of the release coating composition is a film forming polymeric material. These polymeric materials are formed by conventional polymerization techniques such as, for example, solution or emulsion polymerization from one or more ethylenically unsaturated monomers. A typical monomer system used in forming the film forming polymeric material is based on $C_{1-8}$ alkyl esters of acrylic and methacrylic acid, e.g., methyl acrylate, ethyl acrylate, butyl acrylate, hexyl acrylate, 2-ethylhexyl acrylate; hydroxyalkyl acrylates such as hydroxyethyl acrylate; diacrylates; ethylene, styrene, butadiene; unsaturated carboxylic acids, such as acrylic, methacrylic, crotonic, itaconic and maleic acid; acrylonitrile, vinyl esters of $C_{2-10}$ alcohols, e.g., vinyl acetate; vinyl chloride, acrylamide and so forth.

Preferred film forming polymeric systems are emulsion or latex polymers containing polymerized acrylic, vinyl ester/acrylic, vinyl acetate/ethylene and ethylene/vinyl chloride units. Typically the concentration of vinyl acetate and/or vinyl chloride in these copolymer systems range from about 50 to 90% by weight with the balance being an acrylic component or an ethylene comprising from about 5 to 20% by weight. A functional monomer such as an unsaturated carboxylic acid, e.g., methacrylic acid, itaconic acid fumaric acid, etc., acrylamide, N-methyiolacrylamide and the like may be incorporated into the film forming polymer and will comprise about 0–15% by weight of the polymeric material.

As in conventional release coating compositions, the release coating contains a release promoting additive. Typically, these are surface active agents having release promoting properties. Examples include amine polyglycol condensate, an alkyl aryl polyalkyleneoxide, a salt of long-chain alkyl sulfate, N-alkyl sulfosuccinamates and dialkylesters of sulfosuccinc acids. Other release promoting additives are based upon silicones, fluorocarbons of ionic and nonionic character, quaternary alkyl ammonium salts, alkanoic esters of polyols, and polyalkyloxy ethers of monoalkanoic esters of polyols such as sorbitan monopalmitate, oleate and the like.

Surprisingly, inclusion of the high molecular weight polyamide resin described herein obviates the need for conventional crosslinkers, such as, melamine-formaldehyde, metal salts and the like used heretofore to obtain required properties including good aged release. The release coatings herein contain a high molecular weight polyamide resin. The polyamide resin is in the form of a micro-dispersion of a finely divided polyamide resin of the type described in International PCT Application Publication Number W092/16579 which is incorporated by reference.

Microdispersions of fatty acid amides formed by first polymerizing fatty acids having from 2–22 carbon atoms. In addition, a wide variety of dicarboxylic acids can be used, e.g., oxalic, glutaric, malonic, adipic, succinic, suberic, sebacic, and so forth. Preferably one can dimerize an acid such as oleic or linoleic acid to produce the desired acid. These acids then are reacted with one or more aromatic aliphatic or cycloaliphatic diamines. An alkylene diamine, typically having from 3–10 carbon atoms which include ethylene diamine, propane diamine, butane diamine, hexylmethylene and diamine; cycloaliphatic amines such as isophorone diamine, aromatic amines such as m-xylene diamine, and heterocyclic amines such as piperazine and so forth can be used to form the polyamide.

A wide variety of stabilizing agents are added to the polymerized fatty acid amides. These surfactants are selected on the basis that they are capable of acting either as oil-in-water or water-in-oil emulsifying agents for the mixture of polyamide resin. Often nonionic surfactants such as the ethoxylated alcohols sold under the trademark Tergitol and Igepal are incorporated to enhance stabilization of the polyamide resin in water.

A co-surfactant is often used to enhance the formation of the microdispersion of the fatty acid amide. Co-surfactants typically comprise lower alkyl alcohols having up to 10 carbon atoms. Examples include methanol, ethanol, isopropanol, butanol and so forth.

In preparing the microdispersion, the polyamide may be heated to a temperature above the melting point and added to the aqueous mixture of surfactants or the aqueous mixture heated to a temperature above the melting point of the polyamide resin and added to the liquefied resin. A water-in-oil emulsion is formed by mixing the homogenous mixture of the polyamide, surfactant and/or coosurfactant with a second amount of water.

In preferred embodiments, the release coating system will comprise the latex containing the film forming polymeric material, the release additive and the polyamide resin. The dry weight basis of the release coating agent will comprise from about 30 to 90% by weight of the film forming polymeric material, 1 to 20% of the release additive and 2 to 50% by weight of the polyamide resin. Preferred release coating systems will comprise from about 50 to 80% by weight of the latex polymer, 5 to 20% by weight of the release additive and 5 to 30% of the polyamide on a dry weight basis. When present as an aqueous dispersion, the total solids content of the release coating containing the three components will range from about 20 to 60% by weight.

The following examples are provided to illustrate various embodiments of the invention and are not intended to restrict the scope thereof.

EXAMPLE 1

A series of release coating systems were prepared, evaluated and then compared against a control commercial acrylic latex release coat which utilized crosslinking with both copolymerized N-methylol acrylamide and a zinc salt. The performance was measured against general purpose masking tapes and against a high performance masking tape. The series was constructed as a statistical design for the purpose of establishing component parameters. Three film forming polymeric materials present in latex form were evaluated, they were: (1) ethylene-vinyl chloride copolymer containing approximately 14% ethylene and 86% vinyl chloride as the primary monomers which is sold under the trademark Airflex 4530, (2) vinyl acetate/butyl acrylate copolymer containing approximately 86% vinyl acetate and 14% butyl acrylate which is sold under the trademark Flexbond 325 and (3) methyl methacrylate and ethyl acrylate copolymer containing about 55% methyl methacrylate and 45% ethyl acrylate sold under the trademark Flexbond 984. The release additives utilized were 1,2-dicarboxylethyl-N-octadecyl sulfosuccinamate (Aerosol 22) or oleoyliso propanolamide sulfosuccinate (Fizmul MD 318). The polyamide resin was a polymerized $C_{18}$ tall oil fatty acid, largely consisting of a $C_{36}$ dibasic acid (dimer) reacted with an alkylene diamine sold under the trademark Micromid 1022 or Micromid 3022. The polyamide resin had a softening point of greater than 70° C. Table 1 sets forth the conditions and the results.

TABLE 1

Results of Statistically Designed Experiments

| Sample | Component | Weight Ratio | Test Tape | Release Initial | Release Humid Aged | Rolling Ball Initial | Rolling Ball Heat Aged | Hand[6] Peel Heat Aged[6] |
|---|---|---|---|---|---|---|---|---|
| 1 | A4530[1] | 0.76 | A | 10.9 | 20.7 | 6.5 | | |
|   | MICR 1022[2] | 0.20 | | | | | | |
|   | A22[3] | 0.04 | | | | | | |
| 2 | A4530 | 0.28 | A | 15 | 23.1 | 9.5 | | |

TABLE 1-continued

Results of Statistically Designed Experiments

| Sample | Component | Weight Ratio | Test Tape | Release Initial | Release Humid Aged | Rolling Ball Initial | Rolling Ball Heat Aged | Hand[6] Peel Heat Aged[6] |
|---|---|---|---|---|---|---|---|---|
|  | MICR 1022 | 0.68 |  |  |  |  |  |  |
|  | A22 | 0.04 |  |  |  |  |  |  |
| 3 | A4530 | 0.00 | A | 23.7 | 26.3 | 8.9 |  |  |
|  | MICR 1022 | 0.96 |  |  |  |  |  |  |
|  | A22 | 0.04 |  |  |  |  |  |  |
| 4 | A4530 | 0.52 | A | 9.6 | 21.4 | 15.5 |  | TIGHT |
|  | MICR 1022 | 0.42 |  |  |  |  |  | 3 |
|  | A22 | 0.06 |  |  |  |  |  |  |
| 5 | A4530 | 0.71 | A | 8.6 | 21 | 14.4 |  | GOOD |
|  | MICR 1022 | 0.19 |  |  |  |  |  | 1 |
|  | A22 | 0.10 |  |  |  |  |  |  |
| 6 | A4530 | 0.00 | A | 16.7 | 23.8 | 20.1 |  | TIGHT |
|  | MICR 1022 | 0.94 |  |  |  |  |  | AT |
|  | A22 | 0.06 |  |  |  |  |  | 4 |
| 7 | A4530 | 0.79 | A | 13.1 | 22.6 | 25 |  | V TIGHT |
|  | MICR 1022 | 0.21 |  |  |  |  |  | HVY AT |
|  | A22 | 0.00 |  |  |  |  |  | 5 |
| 8 | A4530 | 0.95 | A | 8.7 | 24 | 14.9 |  | GOOD |
|  | MICR 1022 | 0.00 |  |  |  |  |  | 1 |
|  | A22 | 0.05 |  |  |  |  |  |  |
| 9 | A4530 | 0.29 | A | 20.1 | 24.9 | 10.9 |  | V TIGHT |
|  | MICR 1022 | 0.71 |  |  |  |  |  | HVY AT |
|  | A22 | 0.00 |  |  |  |  |  | 5 |
| 10 | A4530 | 0.26 | A | 8.7 | 19.5 | 20 |  | TIGHT |
|  | MICR 1022 | 0.63 |  |  |  |  |  | 3 |
|  | A22 | 0.11 |  |  |  |  |  |  |
| 11 | F325[4] | 0.72 | A | 10.9 | 20.5 |  |  |  |
|  | MICR 1022 | 0.24 |  |  |  |  |  |  |
|  | A22 | 0.03 |  |  |  |  |  |  |
| 12 | F325 | 0.55 | A | 11.9 | 17.6 | 8.8 | 12.6 | EASY-SL |
|  | MICR 1022 | 0.40 |  |  |  |  |  | TIGHT |
|  | A22 | 0.05 |  |  |  |  |  | 1.3 |
| 13 | F325 | 0.73 | A | 10.8 | 18.3 | 8.3 | 13.8 | EASY |
|  | MICR 1022 | 0.18 |  |  |  |  |  |  |
|  | A22 | 0.09 |  |  |  |  |  |  |
| 14 | F325 | 0.00 | A | 20.3 | 16.6 | 11.2 | 8.2 | TIGHT |
|  | MICR 1022 | 0.94 |  |  |  |  |  | SL AT |
|  | A22 | 0.06 |  |  |  |  |  | 3 |
| 15 | F325 | 0.80 | A | 21.3 | 29.2 | 12.9 | 22.9 | V TIGHT |
|  | MICR 1022 | 0.20 |  |  |  |  |  | HVY AT |
|  | A22 | 0.00 |  |  |  |  |  | 5 |
| 16 | F325 | 0.95 | A | 10.1 | 25.5 | 5 | 18.2 | EASY |
|  | MICR 1022 | 0.00 |  |  |  |  |  |  |
|  | A22 | 0.05 |  |  |  |  |  |  |
| 17 | F325 | 0.31 | A | 19.9 | 26.9 | 6.1 | 12.4 | V TIGHT |
|  | MICR 1022 | 0.69 |  |  |  |  |  | HVY AT |
|  | A22 | 0.00 |  |  |  |  |  | 5 |
| 18 | F325 | 0.28 | A | 10.4 | 18 | 11.9 | 14.2 | EASY-V |
|  | MICR 1022 | 0.61 |  |  |  |  |  | SL TGHT |
|  | A22 | 0.11 |  |  |  |  |  | 1 |
| 19 | F325 | 0.73 | A | 9.7 | 26.7 |  |  |  |
|  | MICR 1022 | 0.24 |  |  |  |  |  |  |
|  | A22 | 0.03 |  |  |  |  |  |  |
| 20 | F984[5] | 0.50 | A | 8.7 | 22.5 | 16.7 | 11.8 | SL TGHT |
|  | MICR 1022 | 0.44 |  |  |  |  |  | TIGHT |
|  | A22 | 0.06 |  |  |  |  |  | 2 |
| 21 | F984 | 0.50 | A | 9.5 | 19.1 | 9.1 | 7.3 | SL TGHT |
|  | MICR 1022 | 0.44 |  |  |  |  |  |  |
|  | A22 | 0.06 |  |  |  |  |  |  |
| 22 | F984 | 0.50 | A | 9.1 | 17.7 | 10.6 | 9.6 | EASY- |
|  | MICR 1022 | 0.44 |  |  |  |  |  | SL TGHT |
|  | A22 | 0.06 |  |  |  |  |  |  |
| 23 | F984 | 0.69 | A | 9.1 | 19.5 | 7 | 6.5 | EASY-V |
|  | MICR 1022 | 0.20 |  |  |  |  |  | SL TGHT |
|  | A22 | 0.11 |  |  |  |  |  | 1 |
| 24 | F984 | 0.00 | A | 16.2 | 23.7 | 9.8 | 7.2 | TIGHT- |
|  | MICR 1022 | 0.94 |  |  |  |  |  | V TIGHT |
|  | A22 | 0.06 |  |  |  |  |  |  |
| 25 | F984 | 0.77 | A | 18.8 | 27.1 | 4.7 | 7.4 | V TIGHT |
|  | MICR 1022 | 0.23 |  |  |  |  |  | HVT AT |
|  | A22 | 0.00 |  |  |  |  |  | 5 |

TABLE 1-continued

Results of Statistically Designed Experiments

| Sample | Component | Weight Ratio | Test Tape | Release Initial | Release Humid Aged | Rolling Ball Initial | Rolling Ball Heat Aged | Hand[6] Peel Heat Aged[6] |
|---|---|---|---|---|---|---|---|---|
| 26 | F984 | 0.94 | A | 11.1 | 18.3 | 2.8 | 3.2 | SL TGHT - TIGHT 2 |
|  | MICR 1022 | 0.00 |  |  |  |  |  |  |
|  | A22 | 0.06 |  |  |  |  |  |  |
| 27 | F984 | 0.27 | A | 20 | 29.2 | 3.5 | 5.7 | V TIGHT HVY AT 5 |
|  | MICR 1022 | 0.73 |  |  |  |  |  |  |
|  | A22 | 0.00 |  |  |  |  |  |  |
| 28 | F984 | 0.24 | A | 9.5 | 18.6 | 14.6 | 12.7 | EASY |
|  | MICR 1022 | 0.65 |  |  |  |  |  |  |
|  | A22 | 0.11 |  |  |  |  |  |  |

[1]A4530 refers to Airflex 4530 EVCI emulsion having a solids content of 50% by weight.
[2]Micromid 1022 refers to a polyamide dispersion of a $C_{36}$ dimer fatty acid incorporating isopropanol as a co-surfactant having a solids content of 40% by weight. It is sold by Union Camp Corporation.
[3]A22 refers to Aerosol 22 surfactant having a solids concentration of 35% by weight.
[4]F325 refers to Flexbond 325 emulsion having a solids content of 55% by weight.
[5]F984 refers to Flexbond 984 emulsion having a solids content of 50% by weight.
[6]Hand peel: 1 = easiest release 5 = tightest release Contour plots were based upon the above data. Release component composition was plotted as a function of the force required for release from the pressure sensitive adhesive coated substrate. Initial release and humidity aged release were evaluated. Optimum compositions were generated from the charts.

FIG. 1 is a contour plot of initial release verses component concentration for a release coating based on the ethylene/vinyl chloride resin (EVCL) sold under the trademark Airflex 4530.

Figure 2:
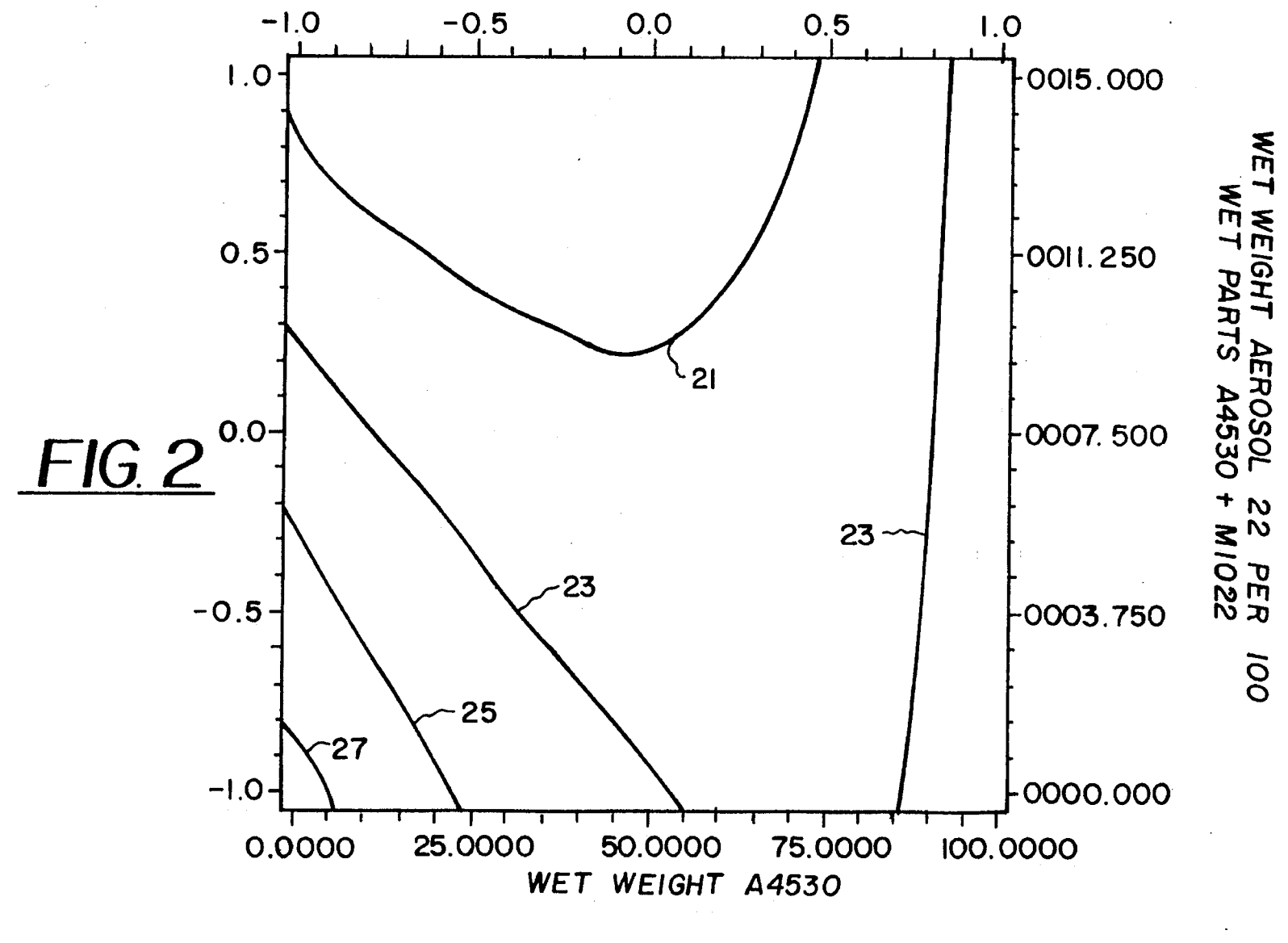

FIG. 2 is a contour plot of humidity aged release verses component concentration for a release coating based on an ethylene/vinyl chloride resin (EVCL) sold under the Airflex trademark.

Figure 3:
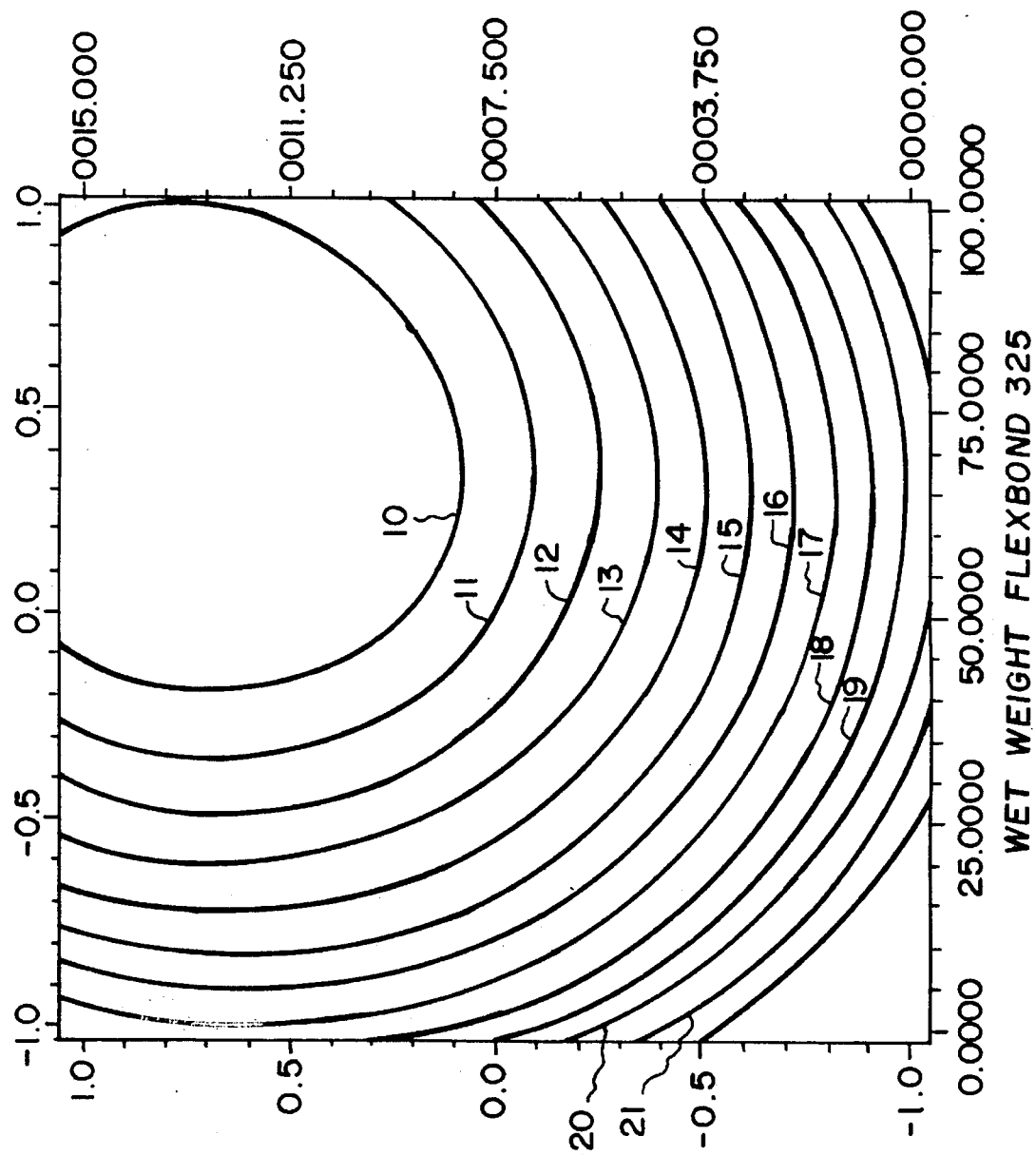
FIG. 3 is a contour plot of initial release verses component concentration for a release coating based on a vinyl acetate/butyl acrylate copolymer.

FIG. 3 is a contour plot of initial release verses component composition for a release coating based on a vinyl acetate/butyl acrylate copolymer sold under the Flexbond 325 trademark.

Figure 4:
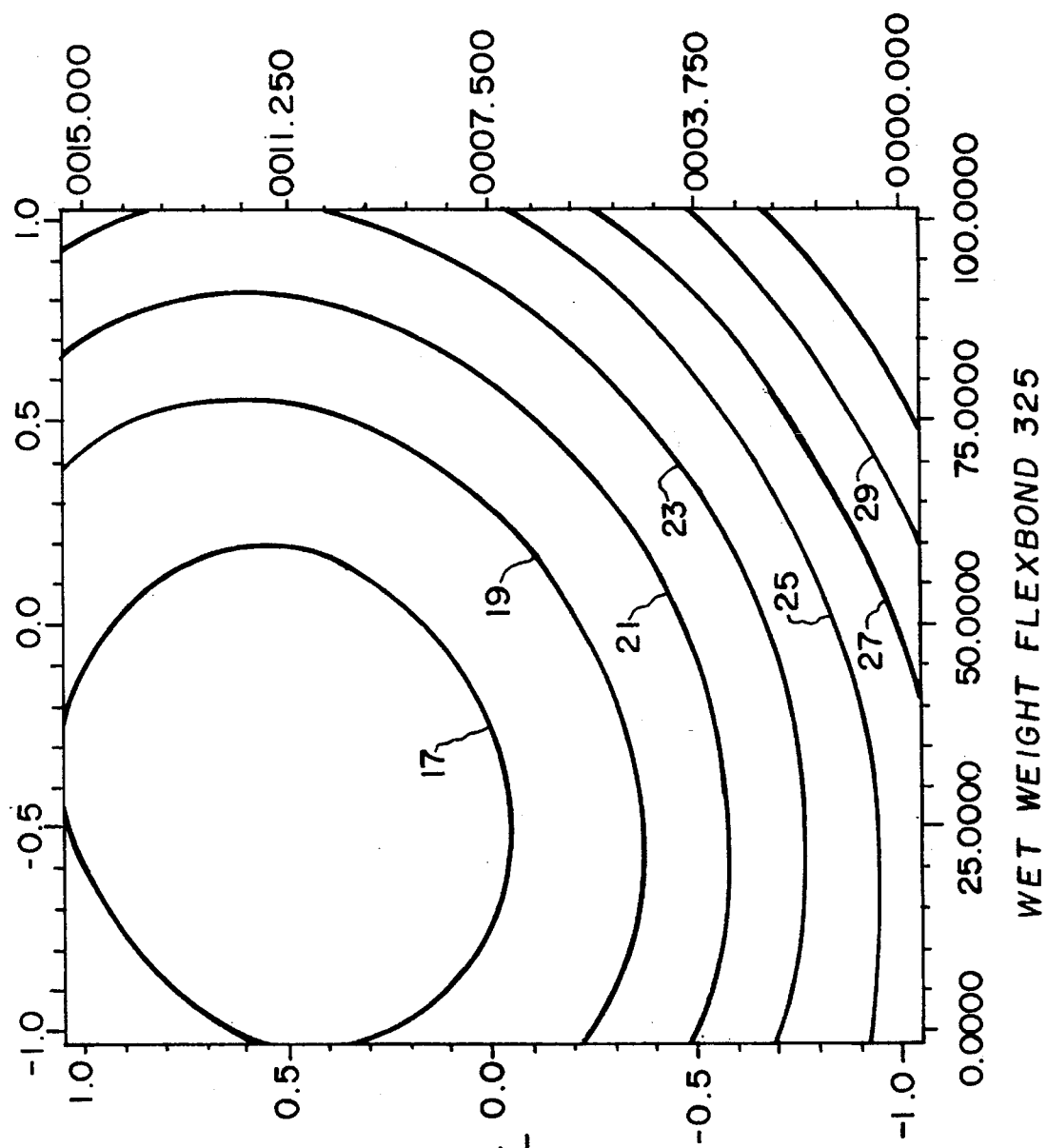
FIG. 4 is a contour plot of humidity aged release verses component concentration for a release coating based on a vinyl acetate/butyl acrylate copolymer.

FIG. 4 is a contour plot of humidity aged release verses component composition for a release coating based on a vinyl acetate/butyl acrylate copolymer (VA) sold under the Flexbond 325 trademark.

Figure 5:
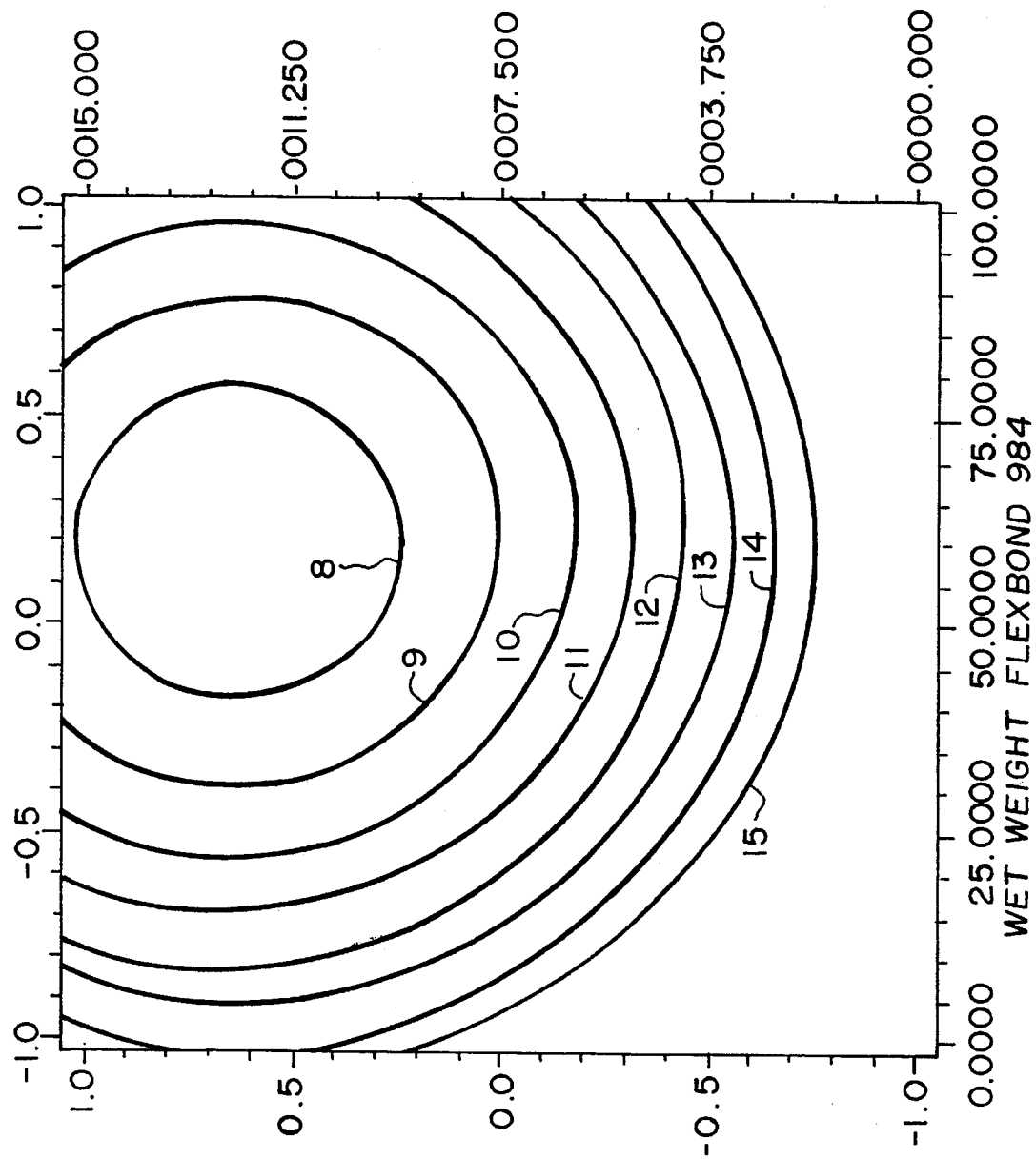
FIG. 5 is a contour plot of initial release verses component concentration for a release coating based on a methyl methacrylate/ethyl acrylate copolymer.

FIG. 5 is a contour plot of initial release verses component concentration for a release coating based on a methyl methacrylate/ethyl acrylate resin (MMEA) sold under the Flexbond 984 trademark.

Figure 6:
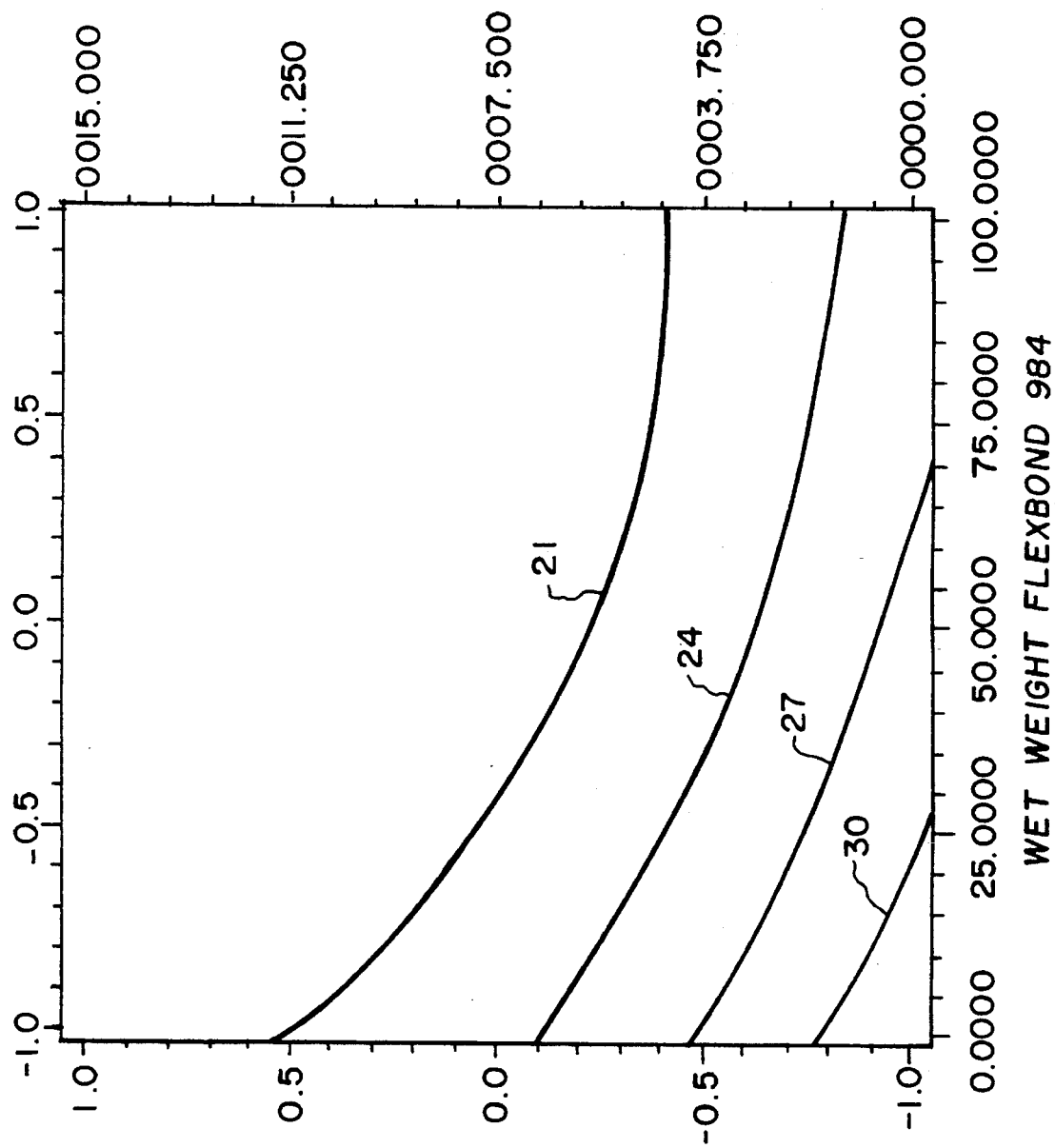
FIG. 6 is a contour plot of humidity aged release verses component concentration for a release coating based on a methyl methacrylate/ethyl acrylate copolymer.

FIG. 6 is a contour plot of humidity aged release verses component composition for a release coating based on a methyl methacrylate/ethyl acrylate (MMEA) resin sold under the Flexbond 984 trademark.

The contour plots show initial release forces of from 7 to 8 at an EVCL level of from 35 to 70% by wet weight, polyamide levels of from about 35 to 65% and Aerosol 22 surface active agent level of about 9 to 15%. When the data is correlated with the humidity aged release data, the preferred limit is from about 35 to 70% EVCI, 30 to 65% polyamide and 9 to 15% Aerosol 22 surfactant. The VA resin showed good initial release at levels from about 35 to 95%, polyamide levels from about 5 to 65% and Aerosol 22 levels of 8 to 15%. When correlated with age release data the level of VA dropped to about 60% as the upper limit. The MMEA resin showed good initial release at levels from about 40 to 80% by weight while age release data showed good results were attainable over a wide range of MMEA levels and polyamide levels as low as about 4%.

EXAMPLE 2

Based on the results obtained from Example 1 optimum formulations were predicted and tested against competitive acrylic based release coat containing copolymerized N-methylol acrylamide and incorporating a metal cross linking agent. General purpose and high tack masking tapes were used as the test specimens. The optimized formulation and tests are set forth in Table 2.

TABLE 2

Optimized Release Coat Formulations

| Dry Weights | Competitive Acrylic A | A | B | C |
|---|---|---|---|---|
| Flexbond 325 |  | 80 | 85 |  |
| Airflex 4530 |  |  |  | 80 |
| Micromid 3022 |  | 11 | 6 | 11 |
| Aerosol 22 |  | 9 | 9 | 9 |
| Release Measured Against General Purpose Masking Tape (oz/in) | | | | |
| 10 min. 180° F. (Initial) | 4.9 | 4.9 | 4.9 | 4.2 |
| 72 hr. 180° F. | 7.7 | 8.4 | 8.4 | 7.5 |
| 72 hr. 150° F., 80% RH | 8.4 | 12.6 | 12.6 | 9.1 |
| Release Measured Against High Tack Masking Tapes (oz/in) | | | | |
| 10 min. 180° F. (Initial) | 10.5 | 8.4 | 8.4 | 9.8 |
| 72 hr. 180° F. | 16.1 | 14.7 | 14.7 | 11.9 |
| 72 hr. 150° F., 80% RH | 18.5 | 21 | 23.8 | 14 | oz/in refers to a force in ounces/inch.
RH refers to relative humidity.

The results show that the release performance using the general purpose tape for each of the polyamide based systems was comparable to the competitive acrylic. With the high tack tape, the humidity aged release of A and B was slightly inferior to the control, but still acceptable. Formulation C was superior to the control, exhibiting a lower release force under all three test conditions, Particularly, desirable is the small change in release force exhibited by C before and after aging (14 vs. 9.8 for C compared to 18.5 vs. 10.5 for the control).

EXAMPLE 3

The procedure of Example 2 was followed except that the release coating utilizing the ethylene/vinyl chloride film forming polymeric material (Formulation C) was compared against a commercial acrylic based release coat. Formulation C was selected as it exhibited the best overall properties of the polyamide based release coatings. Table 3 set forth the conditions and the test results. As before, low release force is desirable, indicating easy unwind without adhering to the pressure sensitive adhesive. Conversely, high re-adhesion force is desirable, indicating that the adhesive force has not been compromised by contamination from the release agent.

Example 4

Comparison of Surfactant

This example provides a comparison between the Aerosol 22 (1,2-dicarboxyehtl-N-octadecyl sulfosuccinamate) surfactant and Fizmul MD 318 (oleoylisopropanolamide sulfosuccinate) surfactant. Table 4 set forth the formulation and the results.

TABLE 3

Comprehensive Evaluation of Sample C

Release and Re adhesion Measured Against Masking Tape

|  | General Purpose Tape | | High Tack Tape | |
| --- | --- | --- | --- | --- |
|  | Competitive Acrylic | Sample C | Competitive Acrylic | Sample C |
| Release (oz/in) | | | | |
| 10 min. 180° F. | 9 | 6 | 15 | 11 |
| 72 hr. 180° F. | 11 | 9 | 20 | 17 |
| 72 hr. 150° F., 80% RH | 12 | 13 | 25 | 14 |
| Re adhesion (oz/in) | | | | |
| 180 degree peel | | | | |
| 10 min. 180° F. | 25 | 30 | 52 | 56 |
| 72 hr. 180° F. | 22 | 24 | 45 | 58 |
| 72 hr. 150° F., 80% RH | 23 | 19 | 40 | 34 |
| 90 degree peel | | | | |
| 10 min. 180° F. | 18 | 23 | 31 | 30 |
| 72 hr. 180° F. | 18 | 19 | 26 | 32 |
| 72 hr. 150° F., 80% RH | 18 | 16 | 24 | 21 |
| Loop tack, (oz/in) | | | | |
| 10 min. 180° F. | 12 | 14 | 17 | 17 |
| 72 hr. 180° F. | 10 | 10 | 16 | 18 |
| 72 hr. 150° F., 80% RH | 11 | 10 | 12 | 9 |

The results show that the ethylene/vinyl chloride based release coatings were about equal or slightly superior to the commercial system in initial release. Re-adhesion and loop tack were also similar for the control and formulation C.

TABLE 4

| Sample | Component | Weight Ratio | Test Tape | Release Initial | Release Humid Aged | Rolling Ball Initial | Rolling Ball Heat Aged | Hand Peel Heat Aged |
| --- | --- | --- | --- | --- | --- | --- | --- | --- |
| 29 | A4530 | 0.72 | A | 7.5 | 12.8 | 8.9 | 8.9 | Easy |
|  | MICR 3022[1] | 0.164 | | | | | | Slightly |
|  | MD318[2] | 0.116 | | | | | | Tight 1.7 |
| 30 | A4530 | 0.72 | A | 10.4 | 14.1 | 5.7 | 7.3 | Easy |
|  | MICR 322 | 0.164 | | | | | | 1 |
|  | A22 | 0.116 | | | | | | |

[1]MICR 3022 polyamide has a solids content of 30% by weight.
[2]Fizmul surfactant has a solids content of 40% by weight.

The results show that both surfactants perform well as release agents in combination with Airflex 4530 latex and Micromid 3022 resin dispersion. It is also possible to combine the surfactants to modify the properties thus taking advantage of the properties of each surfactant.

What is claimed is:

1. In an aqueous release coating for pressure sensitive adhesive tapes comprising a latex film forming polymeric material and a release promoting additive, the improvement which comprises the incorporation of a polyamide resin microdispersed in an aqueous medium, said polyamide resin having a softening point of greater than 70° C., and wherein the latex film forming polymeric material is selected from the group consisting of vinyl chloride/ethylene copolymers, vinyl acetate/ethylene copolymers, and acrylic polymers.

2. The coating of claim 1 wherein the polyamide resin is formed from the reaction of a dimerized $C_{16-18}$ fatty acid with an aliphatic, aromatic or cycloaliphatic amine.

3. The coating of claim 2 wherein the release promoting additive is selected from the group consisting of an N-alkyl sulfosuccinamate, an alkyl sulfosuccinate, an alkyl aryl polyalkyleneoxide, a salt of a long chain alkyl sulfate and an amine polyglycol condensate.

4. The coating of claim 2 wherein the dimerized $C_{16-18}$ fatty acid is reacted with an alkylenediamine wherein the alkylene portion has from 3–10 carbon atoms.

5. The coating of claim 3 wherein the dry weight basis of the release coating comprises from about 30 to 90% by weight of the latex film forming polymeric material, 1 to 20% by weight of the release promoting additive and 2 to 50% by weight of the polyamide resin, based on a total of 100% by weight of the 3 components.

6. The coating of claim 3 wherein the release coating comprises on a dry weight basis from about 50 to 80% by weight of the latex film forming polymer, 5 to 20% by weight of the release promoting additive and 5 to 50% by weight of the polyamide, based on a total of 100% by weight of the 3 components.

7. The coating of claim 5 wherein the latex film forming polymeric material is an vinyl chloride/ethylene copolymer.

8. The coating of claim 5 wherein the latex film forming polymer is a copolymer of vinyl acetate and $C_{1-8}$ alkyl ester of acrylic or methacrylic acid.

9. The coating of claim 5 wherein the latex film forming material is a copolymer of methyl methacrylate and ethyl acrylate.

* * * * *